United States Patent
Jang

(10) Patent No.: US 12,244,186 B2
(45) Date of Patent: Mar. 4, 2025

(54) HAIRPIN TWISTING DEVICE OF HAIRPIN WINDING MOTOR

(71) Applicants: HYUNDAI MOTOR COMPANY, Seoul (KR); KIA CORPORATION, Seoul (KR)

(72) Inventor: Seungkyu Jang, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 63 days.

(21) Appl. No.: 17/983,714

(22) Filed: Nov. 9, 2022

(65) Prior Publication Data
US 2023/0238863 A1  Jul. 27, 2023

(30) Foreign Application Priority Data
Jan. 24, 2022  (KR) ......................... 10-2022-0009898

(51) Int. Cl.
*H02K 15/00* (2006.01)
*H02K 15/04* (2006.01)
*H02K 15/0428* (2025.01)

(52) U.S. Cl.
CPC ..... *H02K 15/0087* (2013.01); *H02K 15/0428* (2013.01)

(58) Field of Classification Search
CPC ................. H02K 15/0087; H02K 15/0428
See application file for complete search history.

(56) References Cited

U.S. PATENT DOCUMENTS

| | | | |
|---|---|---|---|
| 2013/0127288 A1* | 5/2013 | Hamer | H02K 3/38 310/195 |
| 2014/0153661 A1 | 6/2014 | Hochwald | |
| 2014/0237811 A1 | 8/2014 | Guercioni | |
| 2021/0408877 A1* | 12/2021 | Peschina | H02K 15/0031 |
| 2022/0158530 A1* | 5/2022 | Peschina | H02K 15/02 |

FOREIGN PATENT DOCUMENTS

| | | |
|---|---|---|
| KR | 10-1704867 B1 | 2/2017 |
| KR | 10-1717325 B1 | 3/2017 |

* cited by examiner

*Primary Examiner* — Livius R. Cazan
(74) *Attorney, Agent, or Firm* — MCDONNELL BOEHNEN HULBERT & BERGHOFF LLP

(57) ABSTRACT

A hairpin twisting device of a hairpin winding motor includes a fixing jig on which a stator core is seated, the stator core including a plurality of slots positioned through the stator core in a circumferential direction and including a plurality of layers positioned in the slot in a radial direction, and a twisting module positioned under the fixing jig and rotated in a predetermined direction to twist hairpins while clamping respective end portions of the plurality of hairpins inserted into the plurality of slots.

11 Claims, 5 Drawing Sheets

HAIRPIN TWISTING DEVICE OF HAIRPIN WINDING MOTOR

CROSS REFERENCE TO RELATED APPLICATIONS

This application claims priority to and the benefit of Korean Patent Application No. 10-2022-0009898 filed in the Korean Intellectual Property Office on Jan. 24, 2022, the entire contents of which are incorporated herein by reference.

BACKGROUND

(a) Field

The present disclosure relates to a hairpin twisting device of a hairpin winding motor, and more particularly, to a hairpin twisting device of a hairpin winding motor, which may twist a hairpin inserted into a stator core.

(b) Description of the Related Art

Research and development (R&D) and commercialization of an eco-friendly vehicle part are being actively conducted in a vehicle industry in accordance with implementation of greenhouse gas reduction regulations and a global demand for improving fuel efficiency of a vehicle.

Under development is technology for using an electric motor as a sort of the eco-friendly vehicle part to exert a driving force. In particular, to this end, there is a demand for technology not only related to driving efficiency of the motor but also related to motor productivity.

Vehicle manufacturers and eco-friendly part manufacturers apply a hairpin to a driving motor as a part of developed technology to reduce the weight and volume of the eco-friendly part in order to reduce the weight of the vehicle or an eco-friendly vehicle and secure internal space thereof.

A hairpin-applied driving motor according to the prior art may be advantageous in terms of efficiency and power density by increasing a space factor of the driving motor of the vehicle. However, it is very difficult to manufacture this motor and control quality thereof.

In the hairpin-applied driving motor according to the prior art, unlike a general motor that winds a coil, a coil or round wire having a square cross section may be molded or formed into an U-shape and made into the hairpin, and then be inserted into a slot of a stator core.

The hairpin may be inserted into the slot of the stator core in an axial direction of the driving motor.

Ends of the hairpin each protruding outward the slot of the stator core may be twisted to be physically contactable with each other.

The twisted portions of the hairpin may be electrically connected to each other through welding, and an insulating resin may then be applied to the welded portion.

Here, a process of twisting the hairpin may be a process of bending the coils in opposite directions to connect the coils to each other.

During the twisting process according to the prior art, stress may be applied to the stator core, which may cause deformation of the core or sometimes cause damage to a portion coated with the insulating resin.

In addition, the twisting process according to the prior art may require a long process time by twisting the coils inserted into the stator core one by one.

The above information disclosed in this background section is provided only to assist in better understanding of the background of the present disclosure, and may thus include information not included in the prior art already known to those skilled in the art to which the present disclosure pertains.

SUMMARY

An embodiment of the present disclosure provides a hairpin twisting device of a hairpin winding motor, which may be generally used because the device may be applied to a stator core of any specification.

An embodiment of the present disclosure also provides a hairpin twisting device of a hairpin winding motor, which may have improved productivity by twisting hairpins at once while clamping the hairpins.

According to an embodiment of the present disclosure, a hairpin twisting device of a hairpin winding motor includes a fixing jig on which a stator core is seated, the stator core including a plurality of slots positioned through the stator core in a circumferential direction and including a plurality of layers positioned in the slot in a radial direction, and a twisting module positioned under the fixing jig and rotated in a predetermined direction to twist hairpins while clamping respective end portions of the plurality of hairpins inserted into the plurality of slots.

In addition, the fixing jig may include a seating portion stepped from an upper surface of the fixing jig and seating the stator core thereon; and a plurality of through holes positioned in the seating portion and formed through to correspond to the hairpin.

In addition, the twisting module may include a plurality of ring gears respectively corresponding to the plurality of layers, and each including a twisting jig positioned thereon for the hairpin corresponding to each layer to be inserted thereto, a plurality of planetary gears disposed between the plurality of ring gears, and a driving gear externally meshed with an outermost ring gear to operate the ring gears.

In addition, the ring gears may each have outer gear teeth and inner gear teeth different from each other.

In addition, the planetary gears may each have an inner gear corresponding to the outer gear teeth of the ring gear and an outer gear corresponding to the inner gear teeth of the ring gear, which are coupled to each other.

In addition, the outermost ring gear externally meshed with the driving gear may have the outer gear teeth corresponding to gear teeth of the driving gear.

In addition, the plurality of planetary gears may be radially arranged at regular intervals.

In addition, the twisting module may be cross-operated in forward and backward directions in an order of the ring gears arranged from the outside to the center of the twisting module by the operation of the driving gear.

In addition, the plurality of ring gears may respectively have the same rotation angle.

In addition, the twisting jig may have a lower portion connected to the ring gear, and a hairpin groove positioned in an upper surface thereof for the hairpin is inserted thereto.

In addition, the hairpin groove may be a groove having a square cross section.

In addition, the twisting module may be mounted on a jig base by means of a bearing.

In addition, the jig base may have both end portions each mounted on a frame which is positioned under the fixing jig, to slide up and down.

As set forth above, the hairpin twisting device of a hairpin winding motor according to an embodiment of the present disclosure may have the improved productivity by easily performing the twisting process of the hairpin, which is essentially applied to the manufacture of the motor for winding the square-type hairpin.

The hairpin twisting device of a hairpin winding motor may also have the improved production speed by twisting the hairpins at once while clamping the hairpins.

Another effect which may be obtained or predicted by an embodiment of the present disclosure is disclosed directly or implicitly in the detailed description of an embodiment of the present disclosure.

That is, various effects predicted by an embodiment of the present disclosure are disclosed in the detailed description described below.

DETAILED DESCRIPTION

Figure 1:
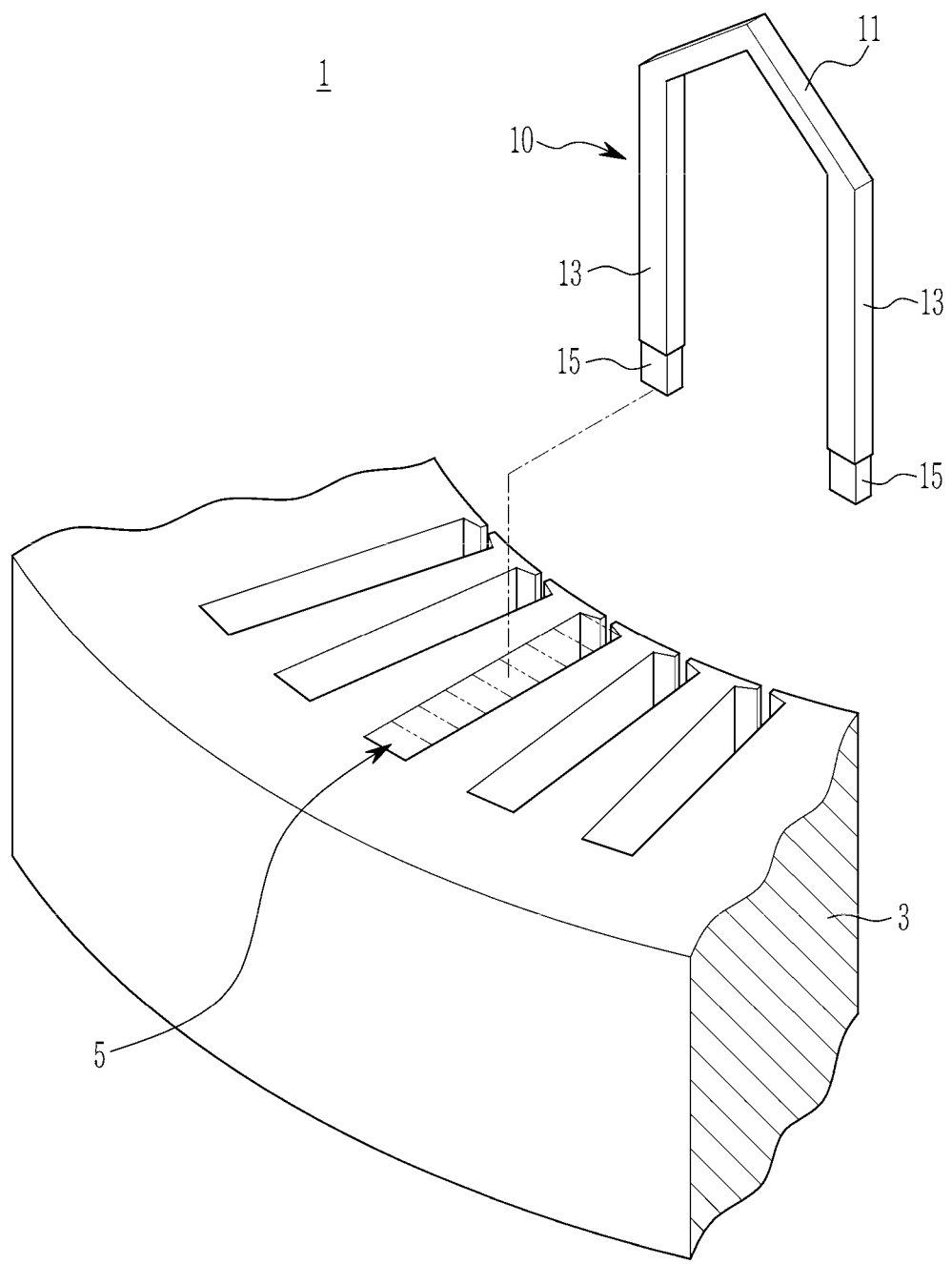
FIG. 1 is a view schematically showing a structure of a stator of a hairpin winding motor applied to a hairpin twisting device of a hairpin winding motor according to an embodiment of the present disclosure.

Hereinafter, an embodiment of the present disclosure will be described in detail with reference to the accompanying drawings for those skilled in the art to which the present disclosure pertains to easily practice the present disclosure. However, the present disclosure may be modified in various different forms, and is not limited to an embodiment provided in this specification.

A portion unrelated to the description is omitted to obviously describe the present disclosure, and the same or similar components are denoted by the same reference numeral throughout the specification.

The size and thickness of each component shown in the accompanying drawings are arbitrarily shown for convenience of explanation, and therefore, the present disclosure is not necessarily limited to contents shown in the accompanying drawings, and the thicknesses are exaggerated in the drawings to clearly represent several portions and regions.

In the following detailed description, terms 'first', 'second' and the like, are used to distinguish components having the same names from each other, and are not necessarily limited to a sequence thereof.

Throughout the specification, unless explicitly described to the contrary, 'comprising' any components will be understood to imply the inclusion of another element rather than the exclusion of any other element.

FIG. 1 is a view schematically showing a structure of a stator of a hairpin winding motor applied to a hairpin twisting device of a hairpin winding motor according to an embodiment of the present disclosure.

Referring to FIG. 1, a stator 1 of the hairpin winding motor applied to an embodiment of the present disclosure may be applied to a driving motor for a hybrid vehicle or an electric vehicle which may obtains driving power by using electric energy as an eco-friendly vehicle.

The driving motor may include a rotor (not shown) spaced apart from the stator 1 by a predetermined gap, and a plurality of permanent magnets (not shown) installed in the rotor.

The stator 1 may include a stator core 3 in which a plurality of electrical steel sheets are stacked on each other.

The stator core may include a plurality of slots positioned through the stator core in a circumferential direction and including a plurality of layers (indicated by a dashed-dotted line in FIG. 1) positioned in the slot in a radial direction.

The stator core 3 may have hairpins 10 wound in a plurality of slots 5.

The hairpin 10 may be made of a square coil, and include a pair of leg portions 13 on both sides thereof with respect to a head portion 11.

The hairpin 10 may be generally U-shaped or V-shaped, and may be the square coil having a square cross section.

These hairpins 10 may be inserted into the predetermined layers (indicated by the dashed-dotted line in FIG. 1) of the slot 5 of the stator core 3.

A de-coated portion 15 positioned at each end of the pair of leg portions 13 may protrude outward the slot 5 in a state where the hairpins 10 is inserted into the stator core 3.

The hairpins 10 may form a winding electrically connected to each other by welding-bonding of the de-coated portion 15.

Although an embodiment of the present disclosure has been described hereinabove as being applied to the stator 1 of the hairpin winding motor employed in the eco-friendly vehicle, it should not be understood that the scope of the present disclosure is necessarily limited thereto, and any motor with the hairpin 10 of various types and usages may be applied to the spirit of the present disclosure.

The hairpin twisting device of a hairpin winding motor according to an embodiment of the present disclosure may be applied to twist the plurality of hairpins inserted into the above-described stator core and mount the same therein.

Figure 2:
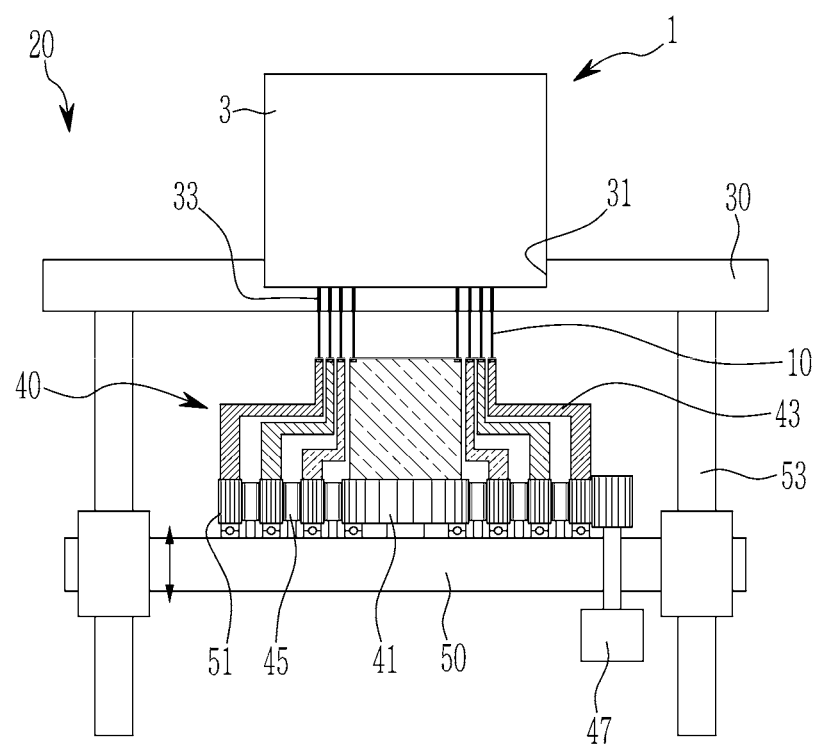
FIG. 2 is a view showing a configuration of the hairpin twisting device of a hairpin winding motor according to an embodiment of the present disclosure.
Figure 3:
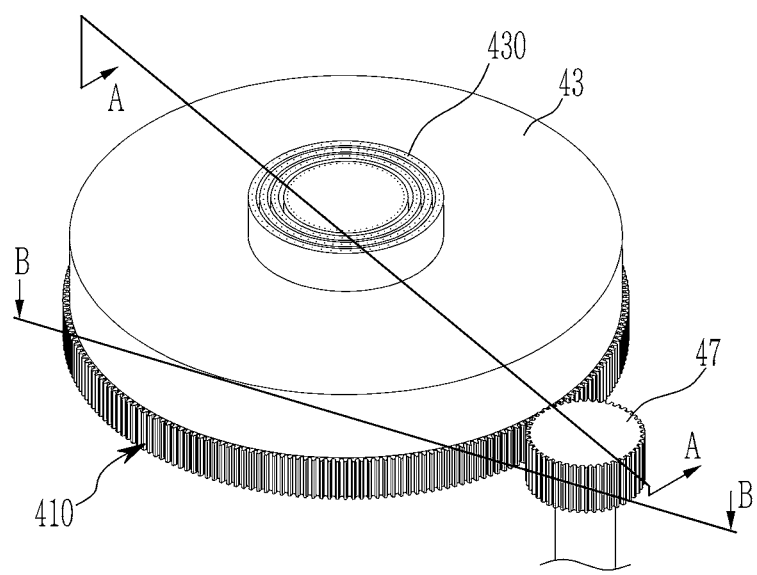
FIG. 3 is a view showing a configuration of a twisting module applied to the hairpin twisting device of a hairpin winding motor according to an embodiment of the present disclosure.
Figure 4:
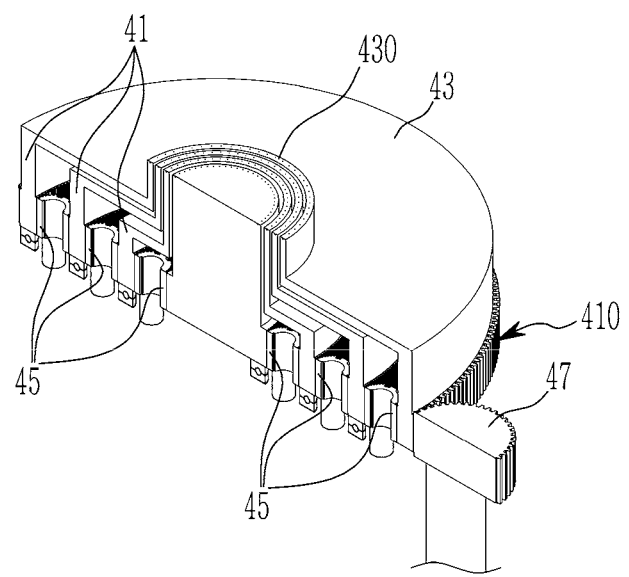
FIG. 4 is a cross-sectional view taken along line A-A of FIG. 3.
Figure 5:
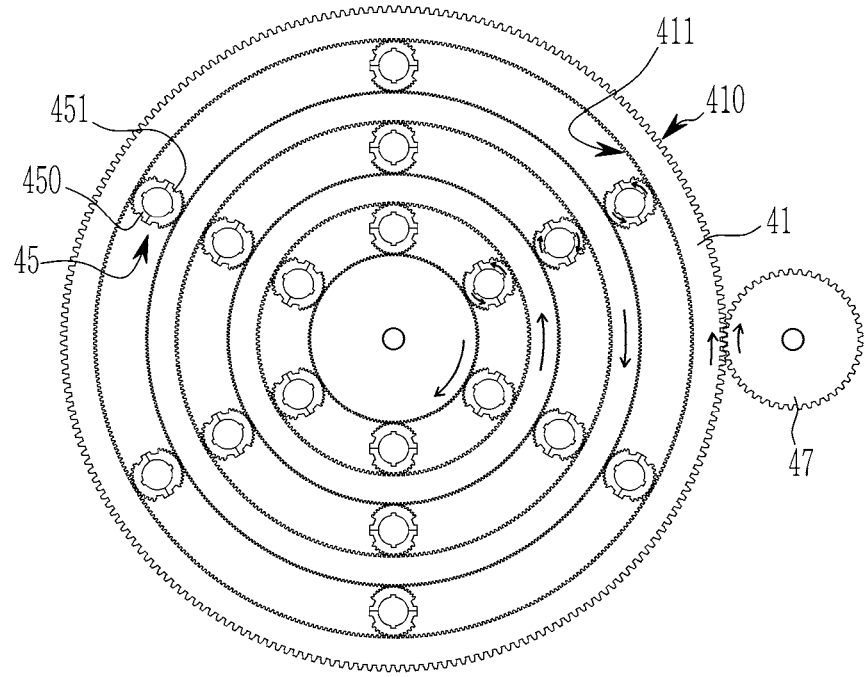
FIG. 5 is a cross-sectional view taken along line B-B of FIG. 3.

FIG. 2 is a view showing a configuration of the hairpin twisting device of a hairpin winding motor according to an embodiment of the present disclosure; FIG. 3 is a view showing a configuration of a twisting module applied to the hairpin twisting device of a hairpin winding motor according to an embodiment of the present disclosure; FIG. 4 is a cross-sectional view taken along line A-A of FIG. 3; and FIG. 5 is a cross-sectional view taken along line B-B of FIG. 3.

Referring to FIG. 2, a hairpin twisting device 20 of a hairpin winding motor according to an embodiment of the present disclosure may roughly include a fixing jig 30 and a twisting module 40.

The stator core 3 may be seated on the fixing jig 30.

Accordingly, the fixing jig 30 may include a seating portion 31 seating the stator core 3 thereon.

The seating portion 31 may be stepped from an upper surface of the fixing jig 30.

A plurality of through holes 33 may be positioned in the seating portion 31. The plurality of through holes 33 may each be formed through to correspond to the hairpin 10. That is, the stator core 3 may be seated on the seating portion 31, and the hairpins 10 may respectively be inserted into the plurality of through holes 33.

The twisting module 40 may be positioned under the fixing jig 30.

Referring to FIGS. 3 to 5, the twisting module 40 may be rotated in a predetermined direction to twist the hairpins 10 while clamping the respective end portions of the plurality of hairpins 10 inserted into the plurality of slots 5.

The twisting module 40 may include a plurality of ring gears 41, a plurality of planetary gears 45 and a driving gear 47.

The plurality of ring gears 41 may respectively correspond to the plurality of layers.

The plurality of ring gears 41 may each have a twisting jig 43 positioned thereon for the hairpin 10 corresponding to each layer to be inserted thereto.

The twisting jig 43 may have a lower portion connected to the ring gear 41, and a hairpin groove 430 positioned in an upper surface of the twisting jig for the hairpin 10 is inserted thereto.

Accordingly, the twisting jigs 43 may have upper portions gathered to each other to correspond to positions of the hairpins 10 inserted into the stator core 3.

Here, the hairpin groove 430 may be a groove having a square cross section. That is, the hairpin groove 430 may have a shape corresponding to the shape of the hairpin 10.

In addition, each of the ring gears 41 may have gear teeth positioned on each of the outer and inner peripheries thereof.

The outer gear teeth 410 and inner gear teeth 411 of the ring gear 41 may be different from each other.

The gear teeth may have the shapes different from each other for the plurality of ring gears 41 having different diameters to be operated in a forward or backward direction while having all the same angle.

The number of ring gears 41 may depend on the number of the layers. That is, the number of the ring gears 41 may be determined based on the number of layers positioned in the slot 5 of the stator core 3.

In addition, the plurality of planetary gears 45 may be disposed between the plurality of ring gears 41.

The planetary gears 45 may each have an inner gear 451 corresponding to the outer gear teeth 410 of the ring gear 41 and an outer gear 450 corresponding to the inner gear teeth 411 of the ring gear 41, which are coupled to each other.

In the planetary gear 45, the inner gear 451 and the outer gear 450 may be different parts and coupled to each other, or the inner gear 451 and the outer gear 450 may be one part and respectively positioned therein.

The plurality of planetary gears 45 may be radially arranged at regular intervals.

As an example of the plurality of planetary gears 45, five planetary gears 45 may be positioned radially between the ring gears 41.

The description describes an example of the plurality of planetary gears 45 according to an embodiment of the present disclosure as five planetary gears 45 positioned between the ring gears 41. However, the number of the planetary gears is not necessarily limited thereto, and may be changed and applied as needed.

Meanwhile, the driving gear 47 may be externally meshed with an outermost ring gear 41. The driving gear 47 may operate the ring gears 41.

The outermost ring gear 41 externally meshed with the driving gear 47 may have the outer gear teeth 410 corresponding to gear teeth of the driving gear 47.

The twisting module 40 configured as described above may be cross-operated in the forward and backward directions in an order of the ring gears 41 arranged from the outside to the center of the twisting module by the operation of the driving gear 47.

Here, the forward direction may be defined as a clockwise direction, and the backward direction may be defined as a counterclockwise direction.

That is, when the outermost ring gear 41 externally meshed with the driving gear 47 is operated in the backward direction, the ring gear 41 positioned there inside may be operated in the forward direction, and another ring gear 41 positioned there inside may be operated in the backward direction.

Here, the ring gears 41 may be operated as described above by the planetary gears 45. Furthermore, the plurality of ring gears 41 may respectively have the same rotation angle. For example, the rotation angle of the ring gear 41 may be set in a range of 20° or more and 30° or less.

The twisting module 40 may be mounted on a jig base 50 by means of a bearing 51.

The jig base 50 may have both end portions each mounted on a frame 53 which is positioned under the fixing jig 30, to slide up and down.

Accordingly, the twisting module 40 may determine a position of the jig base 50 based on the specification of the stator core 3 seated on the fixing jig 30.

Accordingly, the hairpin twisting device 20 of a hairpin winding motor according to an embodiment of the present disclosure may have the improved productivity by easily performing the twisting process of the hairpin 10, which is essentially applied to the manufacture of the motor for winding the square-type hairpin 10.

Further, the hairpin twisting device 20 of a hairpin winding motor may have the improved production speed by twisting the hairpins 10 at once.

In addition, the hairpin twisting device 20 of a hairpin winding motor according to an embodiment of the present disclosure may be generally used because the device may be applied to a stator core 3 of any specification, and may thus require lower investment cost.

Although the present disclosure has been described hereinabove with reference to an embodiment, those skilled in the art needs to understand that various modifications and alterations to the present disclosure may be made without departing from the spirit and scope of the present disclosure as defined in the following claims.

The invention claimed is:

1. A hairpin twisting device of a hairpin winding motor, the device comprising:
   a fixing jig;
   a stator core positioned on the fixing jig, the stator core including a plurality of slots positioned through the stator core in a circumferential direction, and the stator core including a plurality of layers positioned in the plurality of slots in a radial direction; and
   a twisting module positioned under the fixing jig and configured to be rotated in a predetermined direction to twist hairpins while clamping respective end portions of the plurality of hairpins inserted into the plurality of slots;
   wherein the fixing jig includes:
      a seating portion stepped from an upper surface of the fixing jig and seating the stator core; and
      a plurality of through holes each positioned in the seating portion and formed to correspond to the hairpins;

wherein the twisting module includes:
a plurality of ring gears respectively corresponding to the plurality of layers, and each ring gear having a twisting jig for the hairpins corresponding to each layer into which the hairpins are to be inserted,
a plurality of planetary gears positioned between the plurality of ring gears; and
a driving gear externally meshed with an outermost ring gear to operate the plurality of ring gears.

2. The device of claim 1, wherein each of the plurality of ring gears has outer gear teeth and inner gear teeth different from each other.

3. The device of claim 2, wherein each of the planetary gears has an inner gear corresponding to the outer gear teeth of each of the ring gears, and an outer gear corresponding to the inner gear teeth of the each of the ring gears, the inner gear being coupled to the outer gear.

4. The device of claim 2, wherein the twisting module is operated in forward and backward directions in an order of the ring gears arranged from the outside to the center of the twisting module by the driving gear.

5. The device of claim 4, wherein the plurality of ring gears have the same rotation angle.

6. The device of claim 1, wherein the outermost ring gear externally meshed with the driving gear has the outer gear teeth corresponding to gear teeth of the driving gear.

7. The device of claim 1, wherein the plurality of planetary gears are radially arranged at equal intervals.

8. The device of claim 1, wherein each of the twisting jigs has a lower portion connected to the corresponding ring gear, and a hairpin groove, positioned in an upper surface of the twisting jig, into which the hairpins are inserted.

9. The device of claim 8, wherein the hairpin groove has a square cross section.

10. The device of claim 1, wherein the twisting module is mounted on a jig base by a bearing.

11. The device of claim 10, wherein the jig base has both end portions each mounted on a frame which is positioned under the fixing jig, wherein the jig base is configured to slide up and down.

* * * * *